(12) United States Patent
Hosoi et al.

(10) Patent No.: US 8,031,256 B2
(45) Date of Patent: Oct. 4, 2011

(54) ZOOM LENS AND IMAGE PICKUP DEVICE

(75) Inventors: Masaharu Hosoi, Tokyo (JP); Makoto Kanai, Tokyo (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 12/588,941

(22) Filed: Nov. 3, 2009

(65) Prior Publication Data

US 2010/0123958 A1 May 20, 2010

(30) Foreign Application Priority Data

Nov. 19, 2008 (JP) ................................. 2008-295878

(51) Int. Cl.
*H04N 5/262* (2006.01)
*H04N 5/225* (2006.01)
*G02B 15/14* (2006.01)
(52) U.S. Cl. ...................... 348/340; 348/240.3; 359/682
(58) Field of Classification Search ................ 348/240.3, 348/340; 359/680, 682, 689
See application file for complete search history.

(56) References Cited

U.S. PATENT DOCUMENTS

| 6,903,878 B2 * | 6/2005 | Nanba ........................... 359/680 |
| 7,830,615 B2 * | 11/2010 | Kanai et al. ................... 359/689 |

FOREIGN PATENT DOCUMENTS

| JP | 2001-141997 A | 5/2001 |
| JP | 2002-244043 | 8/2002 |
| JP | 2003-043359 A | 2/2003 |
| JP | 2003-307677 A | 10/2003 |
| JP | 2004-013169 A | 1/2004 |
| JP | 2004-191599 | 7/2004 |
| JP | 2005-024988 A | 1/2005 |
| JP | 2005-037727 A | 2/2005 |
| JP | 2007-108531 A | 4/2007 |
| JP | 2007-286577 A | 11/2007 |

OTHER PUBLICATIONS

Japanese Office Action issued Aug. 19, 2010 for corresponding Japanese Application No. 2008-295878.

* cited by examiner

*Primary Examiner* — David N Spector
(74) *Attorney, Agent, or Firm* — Rader, Fishman & Grauer PLLC

(57) ABSTRACT

Disclosed herein is a zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, the first lens group is moved, the second lens group is moved to the object side, and the third lens group is moved to the image side such that an air interval between the first lens group and the second lens group is decreased and such that an air interval between the second lens group and the third lens group is increased.

15 Claims, 13 Drawing Sheets

ZOOM LENS AND IMAGE PICKUP DEVICE

BACKGROUND OF THE INVENTION

1. Field of the Invention

The present invention relates to a zoom lens and an image pickup device, and particularly to a technical field of a zoom lens that is suitable for a photographing optical system of a digital input-output device such as a digital still camera, a digital video camera or the like, which zoom lens is miniaturized and enhanced in performance, and which zoom lens is excellent in mass productivity, and an image pickup device using the zoom lens.

2. Description of the Related Art

Image pickup devices using a solid-state image pickup element such as a digital still camera and the like have recently been spread. With the spread of such image pickup devices such as a digital still camera and the like, even higher image quality is desired. In a digital still camera or the like, in particular, there is a desire for a photographing lens, especially a zoom lens, that has excellent image forming performance and which lens is compatible with a solid-state image pickup element having the large number of pixels.

In addition, there is a need for miniaturization in addition to higher image quality as described above, and there is also a need for a zoom lens that has low decentration sensitivity and which is excellent in mass productivity.

There are many kinds of zoom lenses for digital still cameras. However, as a lens type suitable for achieving a reduced size and a wider angle of view, a three-group zoom lens is known which zoom lens is formed by arranging a first lens group having a negative refractive power, a second lens group having a positive refractive power, and a third lens group having a positive refractive power in order from an object side to an image side (see for example Japanese Patent Laid-Open Nos. 2002-244043, 2004-13169, 2007-286577, 2005-37727 and 2004-191599, hereinafter referred to as Patent Documents 1 to 5, respectively).

In a zoom lens described in Patent Document 1, a first lens group is formed by two lenses, that is, a negative lens and a positive lens, arranged in order from an object side to an image side.

In zoom lenses described in Patent Documents 2 to 5, a first lens group is formed by three lenses, that is, two negative lenses and one positive lens, arranged in order from an object side to an image side.

SUMMARY OF THE INVENTION

However, in the zoom lens described in Patent Document 1, because the first lens group is formed by two lenses, aberration correction is insufficient when an angle of view is to be widened.

In the zoom lens described in Patent Document 2, the refractive power of a first lens of the first lens group is smaller than the refractive power of a second lens, and therefore the diameter of the first lens is increased, which hinders miniaturization.

In the zoom lens described in Patent Document 3, the total length of the first lens group is long, and in particular, the total length of the zoom lens at a time of being housed when the zoom lens is used in a collapsible image pickup device of a type having a lens barrel that extends and contracts is lengthened. Thus miniaturization is hindered.

In the zoom lens described in Patent Document 4, a second lens group is formed by three lenses and miniaturized. However, an amount of aberration correction assigned to each lens forming the second lens group is very large. Therefore, decentration sensitivity in the second lens group is heightened, and thus a degree of manufacturing difficulty is increased.

In the zoom lens described in Patent Document 5, a second lens group is formed by a large number of lenses, that is, five lenses, so that a total optical length is increased and a need for miniaturization is not satisfied. In particular, the total length of the zoom lens at a time of being housed when the zoom lens is used in a collapsible image pickup device of a type having a lens barrel that extends and contracts is lengthened, thus hindering miniaturization.

It is accordingly desirable for a zoom lens and an image pickup device to overcome the above-described problems, and to be miniaturized, enhanced in performance, and improved in mass productivity.

According to an embodiment of the present invention, there is provided a zoom lens formed by arranging a first lens group having a negative refractive power, a second lens group having a positive refractive power, and a third lens group having a positive refractive power in order from an object side to an image side, wherein at a time of varying power from a wide-angle end to a telephoto end, the first lens group is moved, the second lens group is moved to the object side, and the third lens group is moved to the image side such that an air interval between the first lens group and the second lens group is decreased and such that an air interval between the second lens group and the third lens group is increased, the first lens group is formed by arranging a first lens as a negative lens of a meniscus shape having a convex surface facing the object side, a second lens as a negative lens of a meniscus shape having a convex surface facing the object side, and a third lens as a positive lens in order from the object side to the image side, the second lens group has a cemented lens formed by joining together a positive lens of a biconvex shape and a negative lens of a biconcave shape, and is formed by four lenses, and the zoom lens is formed so as to satisfy a following conditional expression (1) and a following conditional expression (2).

$$0.2 < f11/f12 < 0.5 \quad (1)$$

$$0.15 < D1/Dw < 0.2 \quad (2)$$

where f11 denotes a focal length of the first lens of the first lens group, f12 denotes a focal length of the second lens of the first lens group, D1 denotes thickness on an optical axis of the first lens group, and Dw denotes a total optical length at a wide-angle end.

Thus, a sufficient aberration correction is made when an angle of view is widened, decentration sensitivity is decreased, and chromatic aberration of magnification is corrected favorably.

In the zoom lens described above, a surface on the image side of the second lens of the first lens group is desirably formed as an aspheric surface.

By forming the surface on the image side of the second lens of the first lens group as an aspheric surface, distortion aberration and coma aberration are corrected favorably.

In the zoom lens described above, the surface on the image side of the second lens of the first lens group is desirably formed as an aspheric surface by thinly coating a resin.

By forming the surface on the image side of the second lens of the first lens group as an aspheric surface by thinly coating a resin, the aspheric surface can be formed without a steep rise in manufacturing cost.

In the zoom lens described above, an outermost surface on the object side of the second lens group is desirably formed as an aspheric surface.

By forming the outermost surface on the object side of the second lens group as an aspheric surface, coma aberration and astigmatism are corrected favorably.

According to another embodiment of the present invention, there is provided an image pickup device including: a zoom lens; and an image pickup element for converting an optical image formed by the zoom lens into an electric signal; wherein the zoom lens is formed by arranging a first lens group having a negative refractive power, a second lens group having a positive refractive power, and a third lens group having a positive refractive power in order from an object side to an image side, at a time of varying power from a wide-angle end to a telephoto end, the first lens group is moved, the second lens group is moved to the object side, and the third lens group is moved to the image side such that an air interval between the first lens group and the second lens group is decreased and such that an air interval between the second lens group and the third lens group is increased, the first lens group is formed by arranging a first lens as a negative lens of a meniscus shape having a convex surface facing the object side, a second lens as a negative lens of a meniscus shape having a convex surface facing the object side, and a third lens as a positive lens in order from the object side to the image side, the second lens group has a cemented lens formed by joining together a positive lens of a biconvex shape and a negative lens of a biconcave shape, and is formed by four lenses, and the zoom lens is formed so as to satisfy a following conditional expression (1) and a following conditional expression (2).

$$0.2 < f11/f12 < 0.5 \quad (1)$$

$$0.15 < D1/Dw < 0.2 \quad (2)$$

where f11 denotes a focal length of the first lens of the first lens group, f12 denotes a focal length of the second lens of the first lens group, D1 denotes thickness on an optical axis of the first lens group, and Dw denotes a total optical length at a wide-angle end.

Thus, a sufficient aberration correction is made when an angle of view is widened, decentration sensitivity is decreased, and chromatic aberration of magnification is corrected favorably.

According to the embodiments of the present invention, it is thus possible to achieve miniaturization, an enhancement of performance, and an improvement in mass productivity.

DETAILED DESCRIPTION OF THE PREFERRED EMBODIMENTS

Figure 1:
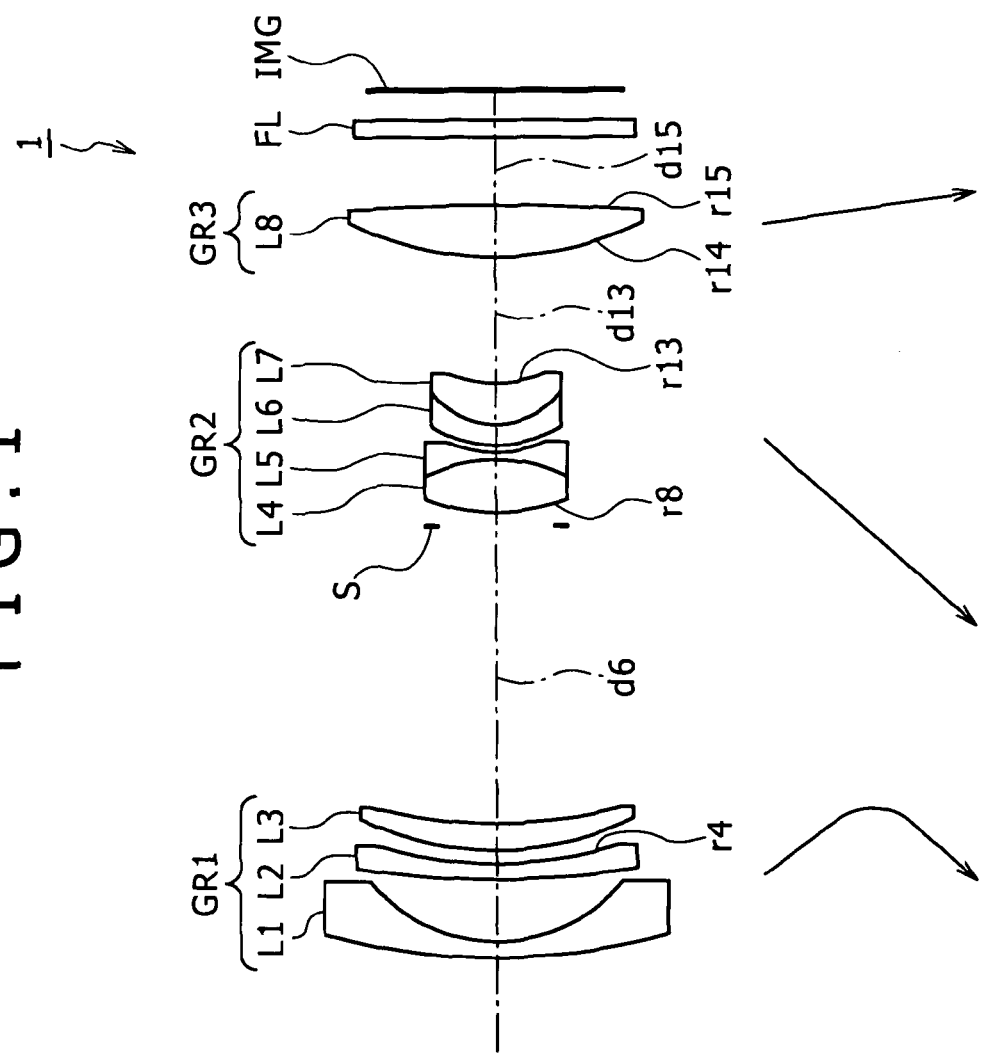
FIG. 1 shows the best mode for carrying out an image pickup device and a zoom lens according to the present invention together with FIGS. 2 to 13, FIG. 1 being a diagram showing the lens configuration of a first embodiment of the zoom lens according to the present invention.

The best mode for carrying out a zoom lens and an image pickup device according to the present invention will hereinafter be described.

A zoom lens according to an embodiment of the present invention will be described first.

The zoom lens according to the embodiment of the present invention is formed by arranging a first lens group having a negative refractive power, a second lens group having a positive refractive power, and a third lens group having a positive refractive power in order from an object side to an image side.

In the zoom lens, at a time of varying power from a wide-angle end to a telephoto end, the first lens group is moved, the second lens group is moved to the object side, and the third lens group is moved to the image side such that an air interval between the first lens group and the second lens group is decreased and such that an air interval between the second lens group and the third lens group is increased.

The first lens group is formed by arranging a first lens as a negative lens of a meniscus shape having a convex surface facing an object side, a second lens as a negative lens of a meniscus shape having a convex surface facing the object side, and a third lens as a positive lens in order from the object side to an image side.

The second lens group has a cemented lens formed by joining together a positive lens of a biconvex shape and a negative lens of a biconcave shape, and is formed by four lenses.

The zoom lens according to an embodiment of the present invention is formed so as to satisfy the following conditional expression (1) and conditional expression (2).

$$0.2 < f11/f12 < 0.5 \quad (1)$$

$$0.15 < D1/Dw < 0.2 \quad (2)$$

where f11 denotes the focal length of the first lens of the first lens group, f12 denotes the focal length of the second lens of the first lens group, D1 denotes the thickness on an optical axis of the first lens group, and Dw denotes a total optical length at a wide-angle end.

In the zoom lens according to the embodiment of the present invention, the first lens group is formed by three lenses, as described above. The zoom lens according to the embodiment of the present invention can thereby make sufficient aberration correction when an angle of view is widened.

In addition, because the second lens group is formed by four lenses, amounts of aberration correction assigned to each lens are decreased, decentration sensitivity is lowered, and a degree of manufacturing difficulty can be decreased.

Further, chromatic aberration of magnification can be corrected favorably by disposing the cemented lens formed by joining together a positive lens of a biconvex shape and a negative lens of a biconcave shape in the second lens group.

Thus, in the zoom lens according to the embodiment of the present invention, by forming the first lens group by three lenses and forming the second lens group by four lenses including the cemented lens, it is possible to widen an angle of view, enhance performance, and improve mass productivity.

The conditional expression (1) defines a ratio between the focal lengths of the first lens and the second lens forming the first lens group.

When the upper limit value of the conditional expression (1) is exceeded, the negative refractive power of the first lens is weakened, and therefore the height of an off-axis light beam passing through the first lens is increased, which invites an increase in lens diameter.

On the other hand, when the lower limit value of the conditional expression (1) is exceeded, it is difficult to correct distortion aberration.

The conditional expression (2) defines the total length of the first lens group.

When the upper limit value of the conditional expression (2) is exceeded, the thickness of the second lens group is increased, and the total optical length is lengthened, so that a need for miniaturization is not satisfied. In particular, the total length of the zoom lens at a time of being housed when the zoom lens is used in a collapsible image pickup device of a type having a lens barrel that extends and contracts is lengthened, thus hindering miniaturization.

On the other hand, when the lower limit value of the conditional expression (2) is exceeded, sensitivity to a decentration error of the first lens group is increased, and thus very high precision is required of assembly.

Therefore, in the zoom lens according to the embodiment of the present invention, by satisfying the conditional expression (1) and the conditional expression (2), it is possible to achieve miniaturization, an enhancement of performance, and an improvement in mass productivity.

In particular, the total length of the zoom lens according to the embodiment of the present invention at a time of being collapsed when the zoom lens is used in a collapsible image pickup device of a type having a lens barrel that extends and contracts can be shortened.

In the zoom lens of one embodiment of the present invention, a surface on the image side of the second lens of the first lens group is desirably formed as an aspheric surface.

By forming the surface on the image side of the second lens of the first lens group as an aspheric surface, distortion aberration and coma aberration are corrected favorably.

In the zoom lens of one embodiment of the present invention, the surface on the image side of the second lens of the first lens group is desirably formed as an aspheric surface by thinly coating a resin.

By forming the surface on the image side of the second lens of the first lens group as an aspheric surface by thinly coating a resin, manufacturing cost is reduced, and favorable aberration correction can be made.

In the zoom lens of one embodiment of the present invention, an outermost surface on the object side of the second lens group is desirably formed as an aspheric surface.

By forming the outermost surface on the object side of the second lens group as an aspheric surface, coma aberration and astigmatism are corrected favorably.

Incidentally, the zoom lens according to the embodiment of the present invention can shift an image by moving (shifting) one lens group of the first to third lens groups or a part of one lens group in a direction substantially perpendicular to the optical axis. The zoom lens can be made to function also as an antivibration optical system by thus moving a lens group or a part of the lens group in the direction substantially perpendicular to the optical axis, and combining the zoom lens with a detecting system for detecting an image blur, a driving system for shifting each lens group, and a controlling system for providing an amount of shift to the driving system on the basis of the output of the detecting system.

In particular, a zoom lens according to one embodiment of the present invention desirably has a function of correcting an image blur by shifting a second lens group in a vertical direction with respect to an optical axis.

An image can be shifted with a small variation in aberration by shifting the second lens group in the vertical direction with respect to the optical axis. In addition, because the second lens group has a smaller diameter than other groups and has a light weight, miniaturization and power saving can be achieved by setting the second lens group as a lens group for correcting an image blur.

The zoom lens according to the embodiment of the present invention desirably performs focusing by moving the first lens group or the third lens group in the direction of the optical axis. Using the third lens group as a lens group for focusing, in particular, makes it easy to avoid interference with a driving system for driving and controlling a shutter unit and an iris unit and with an antivibration driving system for shifting a lens group, and makes it possible to achieve miniaturization.

A concrete embodiment of the zoom lens according to the present invention and numerical embodiments in which concrete numerical values are applied to the embodiment will next be described with reference to drawings and tables.

Incidentally, the meanings of symbols shown in the tables and description in the following and the like are as follows.

"si" is the surface number of an ith surface numbered from the object side to the image side, "ri" is the radius of curvature of the ith surface, "di" is a surface interval on the axis between the ith surface and an (i+1)th surface, "ni" is the index of refraction at the d-line (wavelength of 587.6 nm) of a material forming a lens including an ith surface, and "vi" is the Abbe number at the d-line of the material forming the lens including the ith surface. In regard to the surface number, "S" denotes diaphragm. In regard to the radius of curvature, "ASP" denotes that the surface is an aspheric surface, and "INF" denotes that the radius of curvature of the surface is infinite.

Lenses used in each numerical embodiment include lenses whose lens surface is formed as an aspheric surface. Letting "x" be a distance in the direction of the optical axis from the vertex of the lens surface, "y" be a height in a direction perpendicular to the optical axis, "c" be a paraxial curvature (reciprocal of a radius of curvature) at the vertex of the lens, "K" be a conic constant, and "Ai" be an aspheric coefficient, the aspheric shape is defined by the following Equation 1.

$$x = \frac{c \cdot y^2}{1 + \{1 - (1+K) \cdot c^2 \cdot y^2\}^{1/2}} + \Sigma Ai \cdot yi \quad \text{[Equation 1]}$$

A first to a third embodiment of the present invention will hereinafter be described. Zoom lenses according to the first to third embodiments are each formed by arranging a first lens group having a negative refractive power, a second lens group having a positive refractive power, and a third lens group having a positive refractive power in order from an object side to an image side. In addition, in each of the zoom lenses according to the first to third embodiments, at a time of varying power from a wide-angle end to a telephoto end, the first lens group is moved, the second lens group is moved to the object side, and the third lens group is moved to the image side such that an air interval between the first lens group and the second lens group is decreased and such that an air interval between the second lens group and the third lens group is increased.

FIG. 1 is a diagram showing the lens configuration of a zoom lens 1 according to a first embodiment of the present invention.

The zoom lens 1 according to the first embodiment has eight lenses, as shown in FIG. 1.

The first lens group GR1 is formed by arranging a first lens L1 as a negative meniscus lens having a convex surface facing the object side, a second lens L2 as a negative meniscus lens having a surface on the image side formed as an aspheric surface and having a convex surface facing the object side, and a third lens L3 as a positive meniscus lens having a convex surface facing the object side in order from the object side to the image side.

A second lens group GR2 is formed by two cemented lenses. The cemented lens disposed on the object side is formed by a fourth lens L4 as a biconvex lens having a surface on the object side formed as an aspheric surface and a fifth lens L5 as a biconcave lens. The cemented lens disposed on the image side is formed by a sixth lens L6 as a negative meniscus lens having a convex surface facing the object side and a seventh lens L7 as a positive meniscus lens having a surface on the image side formed as an aspheric surface.

The third lens group GR3 is formed by arranging an eighth lens L8 as a biconvex lens having both surfaces formed as aspheric surfaces.

A diaphragm S (diaphragm surface r7) is disposed between the first lens group GR1 and the second lens group GR2.

A filter FL is arranged between the third lens group GR3 and an image surface IMG.

Table 1 shows lens data of a first numerical embodiment in which concrete numerical values are applied to the zoom lens 1 according to the first embodiment.

TABLE 1

| si | ri | di | ni | vi |
|---|---|---|---|---|
| 1 | 39.741 | 1.000 | 1.883000 | 40.8 |
| 2 | 11.287 | 4.000 | | |
| 3 | 53.365 | 0.997 | 1.618000 | 63.9 |
| 4 | 25.235 (ASP) | 0.900 | | |
| 5 | 19.4 | 1.750 | 1.923000 | 20.9 |
| 6 | 39.412 | d6 | | |
| 7 (S) | INF | 0.500 | | |
| 8 | 10.366 (ASP) | 3.504 | 1.851000 | 40.1 |
| 9 | −11.916 | 0.500 | 1.672700 | 32.2 |
| 10 | 9.372 | 0.373 | | |
| 11 | 7.878 | 1.485 | 2.000690 | 25.5 |
| 12 | 4.931 | 2.740 | 1.694000 | 53.2 |
| 13 | 9.684 (ASP) | d13 | | |
| 14 | 26.993 (ASP) | 3.300 | 1.694000 | 53.2 |
| 15 | −50.286 (ASP) | d15 | | |
| 16 | INF | 1.000 | 1.516800 | 64.2 |
| 17 | INF | | | |

In the zoom lens 1, the surface (r4) on the image side of the second lens L2 of the first lens group GR1, the surface (r8) on the object side of the fourth lens L4 of the second lens group GR2, the surface (r13) on the image side of the seventh lens L7 of the second lens group GR2, the surface (r14) on the object side of the eighth lens L8 of the third lens group GR3, and the surface (r15) on the image side of the eighth lens L8 of the third lens group GR3 are formed as aspheric surfaces. The 4th-order, 6th-order, 8th-order, and 10th-order aspheric coefficients A4, A6, A8, and A10 of the aspheric surfaces in the first numerical embodiment are shown in Table 2 together with the conic constant K.

Incidentally, "E-i" in Table 2 and each table showing aspheric coefficients to be described later denotes an exponential expression having a base of 10, that is, "$10^{-i}$." For example, "0.12345E-05" denotes "$0.12345 \times 10^{-5}$."

TABLE 2

| si | K | A4 | A6 | A8 | A10 |
|---|---|---|---|---|---|
| 4 | 0.00000E+00 | −4.364010E−05 | −3.251930E−08 | −1.243220E−09 | −1.284790E−11 |
| 8 | 0.00000E+00 | −5.835420E−05 | −9.723970E−07 | −9.852930E−09 | −3.822430E−11 |
| 13 | 0.00000E+00 | 3.980930E−04 | 1.109690E−06 | 2.448890E−07 | −1.484180E−08 |
| 14 | 0.00000E+00 | 8.382740E−05 | −1.060670E−06 | 8.559600E−09 | −2.865500E−11 |
| 15 | 0.00000E+00 | 1.879760E−04 | −2.662970E−06 | 2.040790E−08 | −7.034260E−11 |

In the zoom lens 1, at a time of varying power between a wide-angle end state and a telephoto end state, a surface interval d6 between the first lens group GR1 and the diaphragm S, a surface interval d13 between the second lens group GR2 and the third lens group GR3, and a surface interval d15 between the third lens group GR3 and the filter FL are changed. Variable intervals in a wide-angle end state (focal length f=10.66), an intermediate focal length state (focal length f=17.73), and a telephoto end state (focal length f=30.70) of each surface interval in the first numerical embodiment are shown in Table 3 together with an F-number Fno and a half angle of view ω.

TABLE 3

| | Fno | | |
|---|---|---|---|
| | 2.87 | 3.85 | 5.60 |
| f | 10.66 | 17.73 | 30.70 |
| ω | 38.37 | 24.01 | 14.15 |
| d6 | 19.600 | 9.457 | 2.600 |
| d13 | 8.216 | 17.057 | 30.490 |
| d15 | 4.611 | 3.458 | 1.941 |

Figure 2:
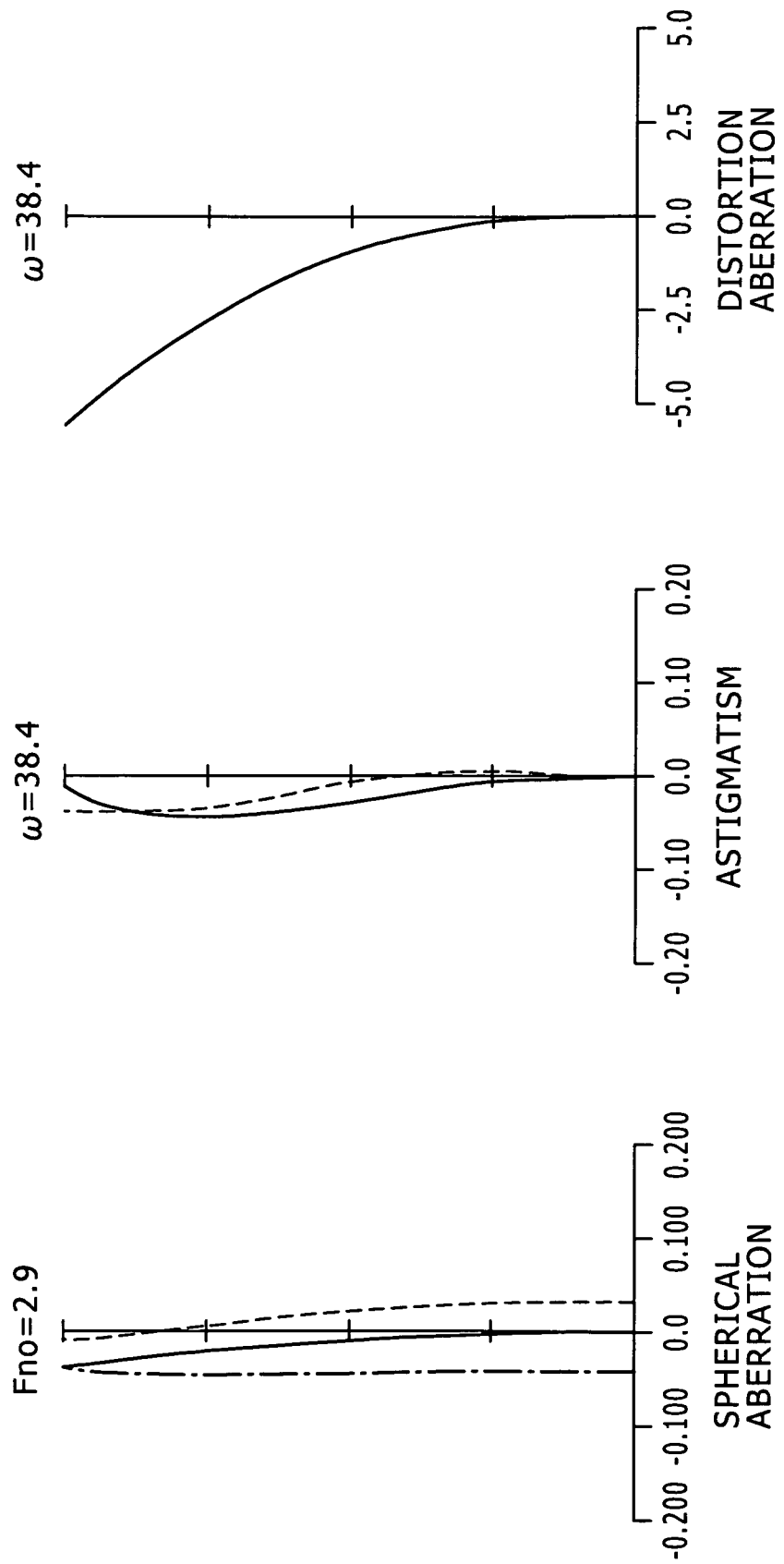
FIG. 2 is a diagram showing aberrations of a numerical embodiment in which concrete numerical values are applied to the first embodiment together with FIG. 3 and FIG. 4, FIG. 2 being a diagram showing spherical aberration, astigmatism, and distortion aberration in a wide-angle end state.
Figure 3:
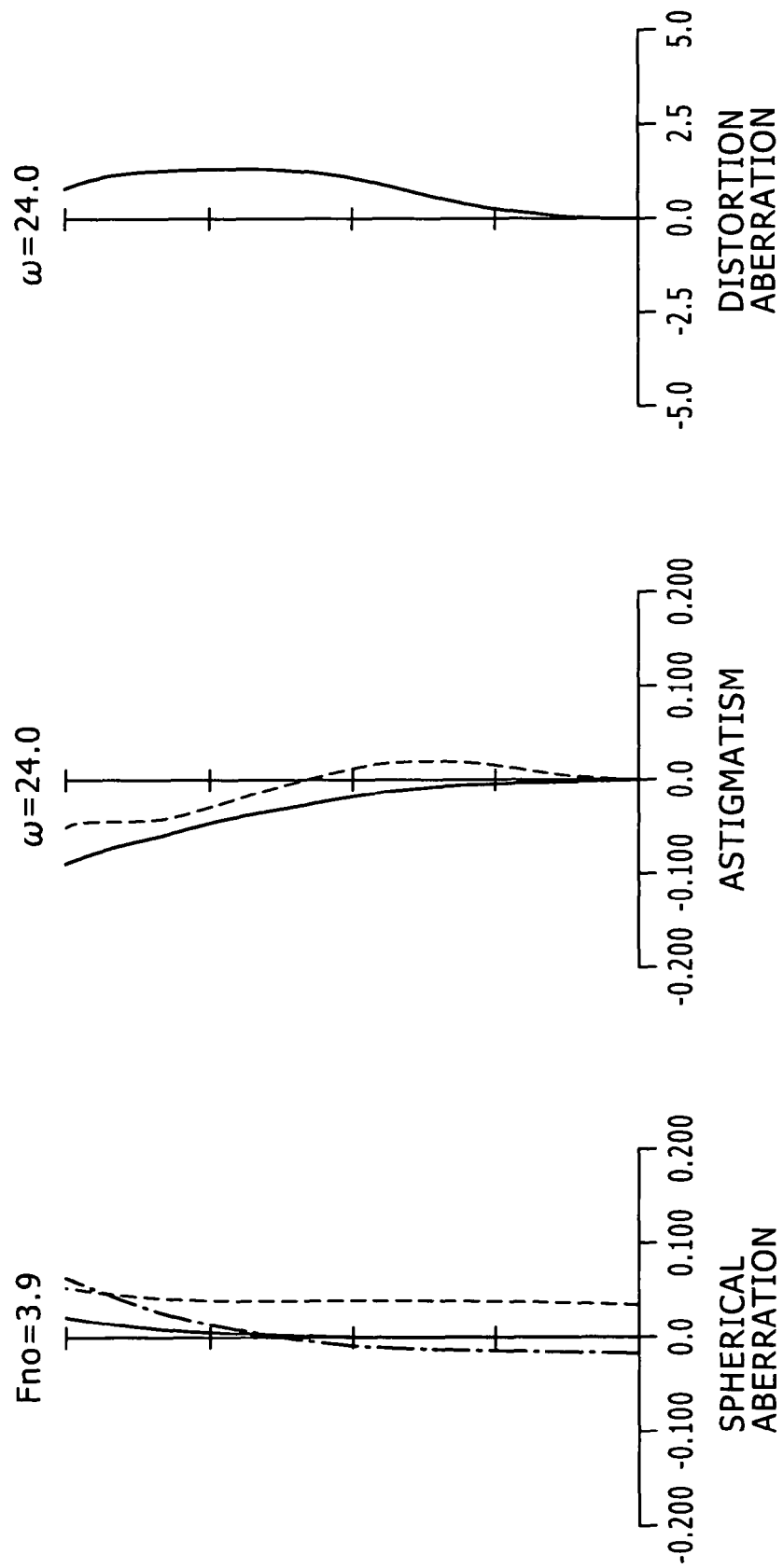
FIG. 3 is a diagram showing spherical aberration, astigmatism, and distortion aberration in an intermediate focal length state.
Figure 4:
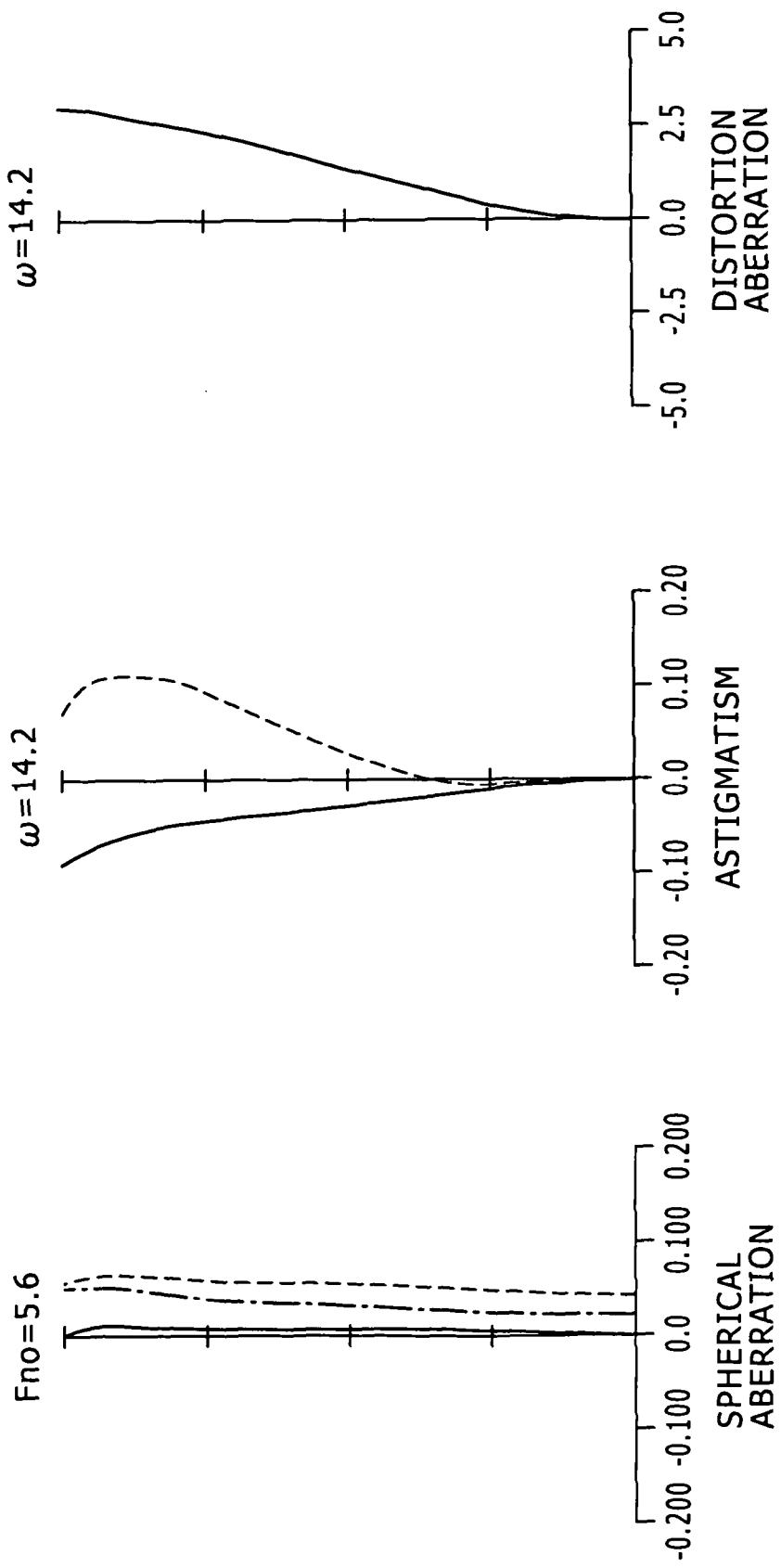
FIG. 4 is a diagram showing spherical aberration, astigmatism, and distortion aberration in a telephoto end state.

FIGS. 2 to 4 are diagrams of various aberrations in an infinity in-focus state in the first numerical embodiment. FIG. 2 is a diagram of various aberrations in the wide-angle end state (focal length f=10.66). FIG. 3 is a diagram of various aberrations in the intermediate focal length state (focal length f=17.73). FIG. 4 is a diagram of various aberrations in the telephoto end state (focal length f=30.70).

In the diagrams of spherical aberrations shown in FIGS. 2 to 4, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 2 to 4, a value in a sagittal image surface is shown by a solid line, and a value in a meridional image surface is shown by a broken line.

It is clear from each aberration diagram that the first numerical embodiment favorably corrects various aberrations and has excellent image forming performance.

Figure 5:
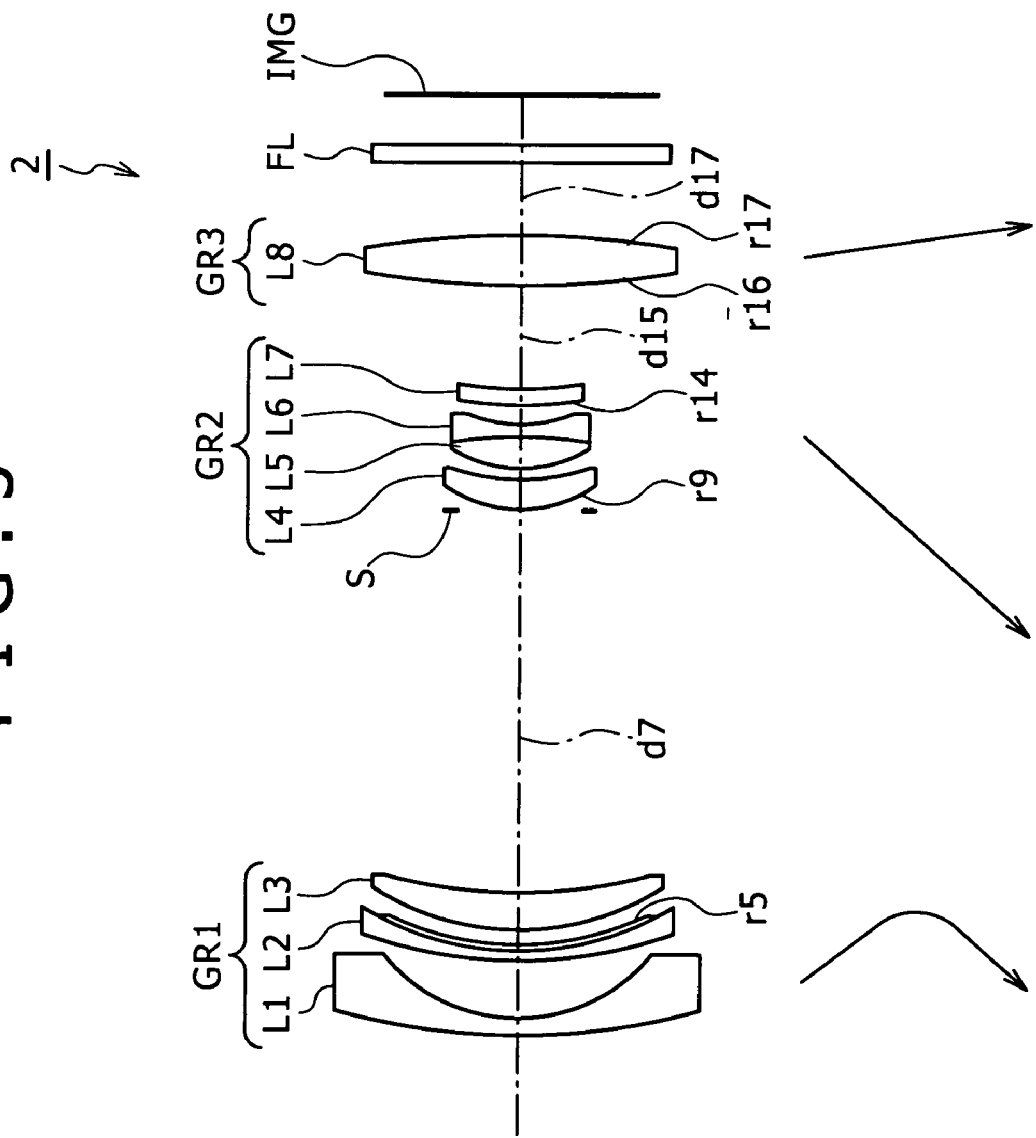
FIG. 5 is a diagram showing the lens configuration of a second embodiment of the zoom lens according to the present invention.

FIG. 5 is a diagram showing the lens configuration of a zoom lens 2 according to a second embodiment of the present invention.

The zoom lens 2 according to the second embodiment has eight lenses, as shown in FIG. 5.

The first lens group GR1 is formed by arranging a first lens L1 as a negative meniscus lens having a convex surface facing the object side, a second lens L2 as a negative meniscus lens having a surface on the image side formed as an aspheric surface and having a convex surface facing the object side, and a third lens L3 as a positive meniscus lens having a convex surface facing the object side in order from the object side to the image side.

The aspheric surface of the second lens L2 is formed by thinly coating a resin.

A second lens group GR2 is formed by arranging a fourth lens L4 as a positive meniscus lens having a surface on the object side formed as an aspheric surface and having a convex surface facing the object side, a cemented lens, and a seventh lens L7 as a positive meniscus lens having a surface on the object side formed as an aspheric surface and having a convex surface facing the object side in order from the object side to the image side. The cemented lens is formed by joining together a fifth lens L5 as a biconvex lens and a sixth lens L6 as a biconcave lens.

The third lens group GR3 is formed by arranging an eighth lens L8 as a biconvex lens having both surfaces formed as aspheric surfaces.

A diaphragm S (diaphragm surface r8) is disposed between the first lens group GR1 and the second lens group GR2.

A filter FL is arranged between the third lens group GR3 and an image surface IMG.

Table 4 shows lens data of a second numerical embodiment in which concrete numerical values are applied to the zoom lens 2 according to the second embodiment.

TABLE 4

| si | ri | di | ni | vi |
|---|---|---|---|---|
| 1 | 63.176 | 1.115 | 1.88300 | 40.8 |
| 2 | 13.793 | 4.221 | | |
| 3 | 36.797 | 0.892 | 1.61800 | 63.4 |
| 4 | 21.049 | 0.129 | 1.53420 | 41.7 |
| 5 | 16.476 (ASP) | 1.338 | | |
| 6 | 20.095 | 3.038 | 1.84666 | 23.8 |
| 7 | 57.255 | d7 | | |
| 8 (S) | INF | 0.000000 | | |
| 9 | 10.618 (ASP) | 2.257 | 1.81000 | 41.0 |
| 10 | 26.624 | 0.762 | | |
| 11 | 13.212 | 2.294 | 1.72916 | 54.7 |
| 12 | −36.962 | 0.892 | 1.75520 | 27.5 |
| 13 | 9.292 | 1.777 | | |
| 14 | 24.128 (ASP) | 1.117 | 1.52470 | 56.2 |
| 15 | 35.097 | d15 | | |
| 16 | 61.790 (ASP) | 3.338 | 1.66955 | 55.4 |
| 17 | −40.879 (ASP) | d17 | | |
| 18 | INF | 1.000 | 1.556708 | 58.6 |
| 19 | INF | | | |

In the zoom lens 2, the surface (r5) on the image side of the second lens L2 of the first lens group GR1, the surface (r9) on the object side of the fourth lens L4 of the second lens group GR2, the surface (r14) on the object side of the seventh lens L7 of the second lens group GR2, the surface (r16) on the object side of the eighth lens L8 of the third lens group GR3, and the surface (r17) on the image side of the eighth lens L8 of the third lens group GR3 are formed as aspheric surfaces. The 4th-order, 6th-order, 8th-order, and 10th-order aspheric coefficients A4, A6, A8, and A10 of the aspheric surfaces in the second numerical embodiment are shown in Table 5 together with the conic constant K.

TABLE 5

| si | K | A4 | A6 | A8 | A10 |
|---|---|---|---|---|---|
| 5 | 0.00000E+00 | −5.236750E−05 | −1.525660E−07 | 8.157150E−10 | −8.456110E−12 |
| 9 | 0.00000E+00 | 3.165860E−06 | 6.620320E−08 | 3.403950E−09 | 5.522290E−11 |
| 14 | 0.00000E+00 | −3.252490E−04 | −2.796170E−06 | −1.477080E−07 | −7.875360E−10 |
| 16 | 0.00000E+00 | 1.000480E−04 | −1.058080E−06 | −2.325910E−09 | 7.243400E−11 |
| 17 | 0.00000E+00 | 1.673740E−04 | −1.560980E−06 | −3.107300E−09 | 9.240790E−11 |

In the zoom lens 2, at a time of varying power between a wide-angle end state and a telephoto end state, a surface interval d7 between the first lens group GR1 and the diaphragm S, a surface interval d15 between the second lens group GR2 and the third lens group GR3, and a surface interval d17 between the third lens group GR3 and the filter FL are changed. Variable intervals in a wide-angle end state (focal length f=10.68), an intermediate focal length state (focal length f=17.93), and a telephoto end state (focal length f=31.11) of each surface interval in the second numerical embodiment are shown in Table 6 together with an F-number Fno and a half angle of view ω.

TABLE 6

| | Fno | | |
|---|---|---|---|
| | 2.87 | 3.77 | 5.42 |
| f | 10.68 | 17.93 | 31.11 |
| ω | 38.57 | 23.95 | 14.12 |
| d7 | 28.907 | 14.819 | 6.095 |
| d15 | 7.801 | 18.250 | 35.123 |
| d17 | 5.796 | 4.699 | 2.419 |

Figure 6:
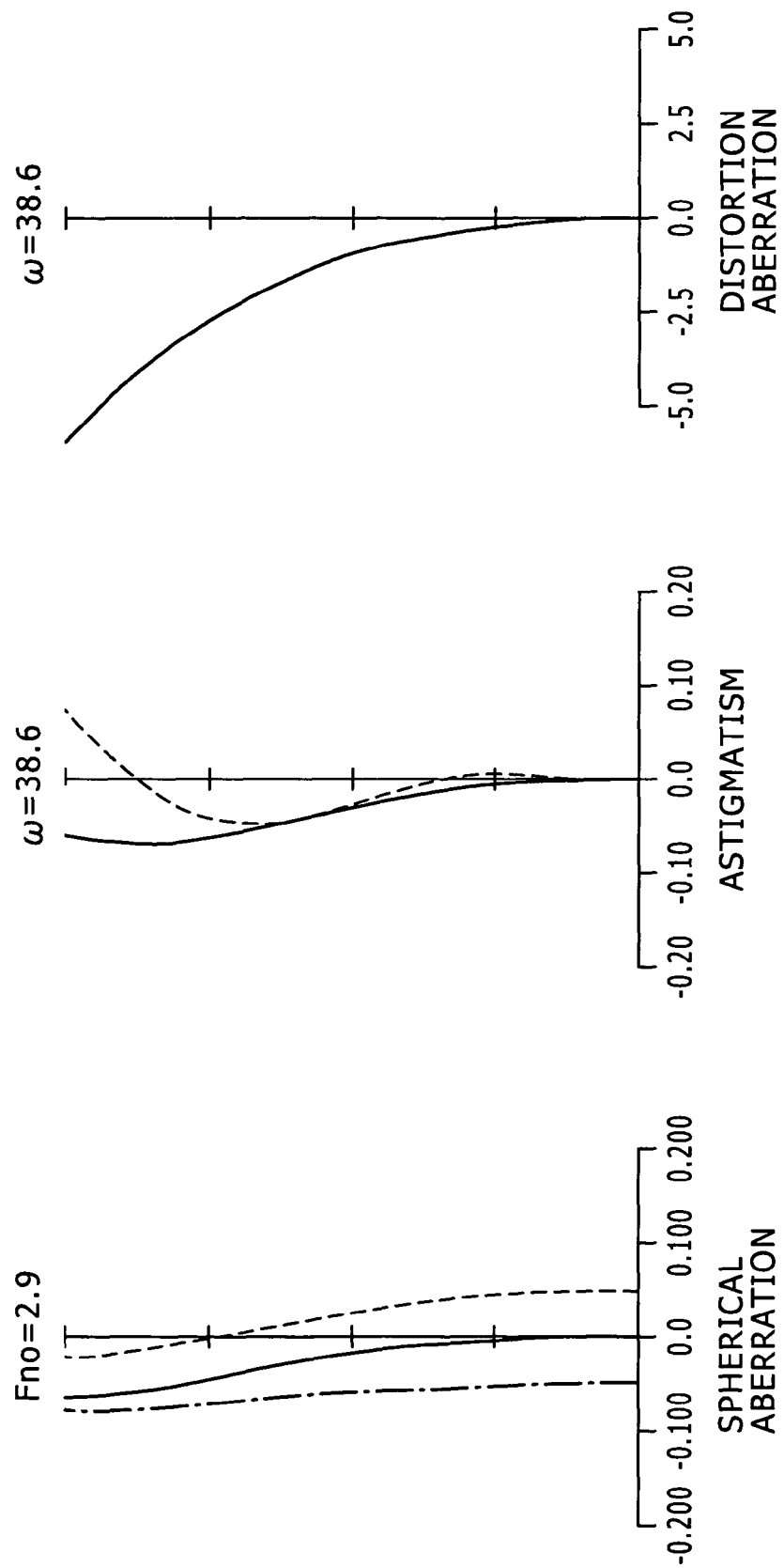
FIG. 6 is a diagram showing aberrations of a numerical embodiment in which concrete numerical values are applied to the second embodiment together with FIG. 7 and FIG. 8, FIG. 6 being a diagram showing spherical aberration, astigmatism, and distortion aberration in a wide-angle end state.
Figure 7:
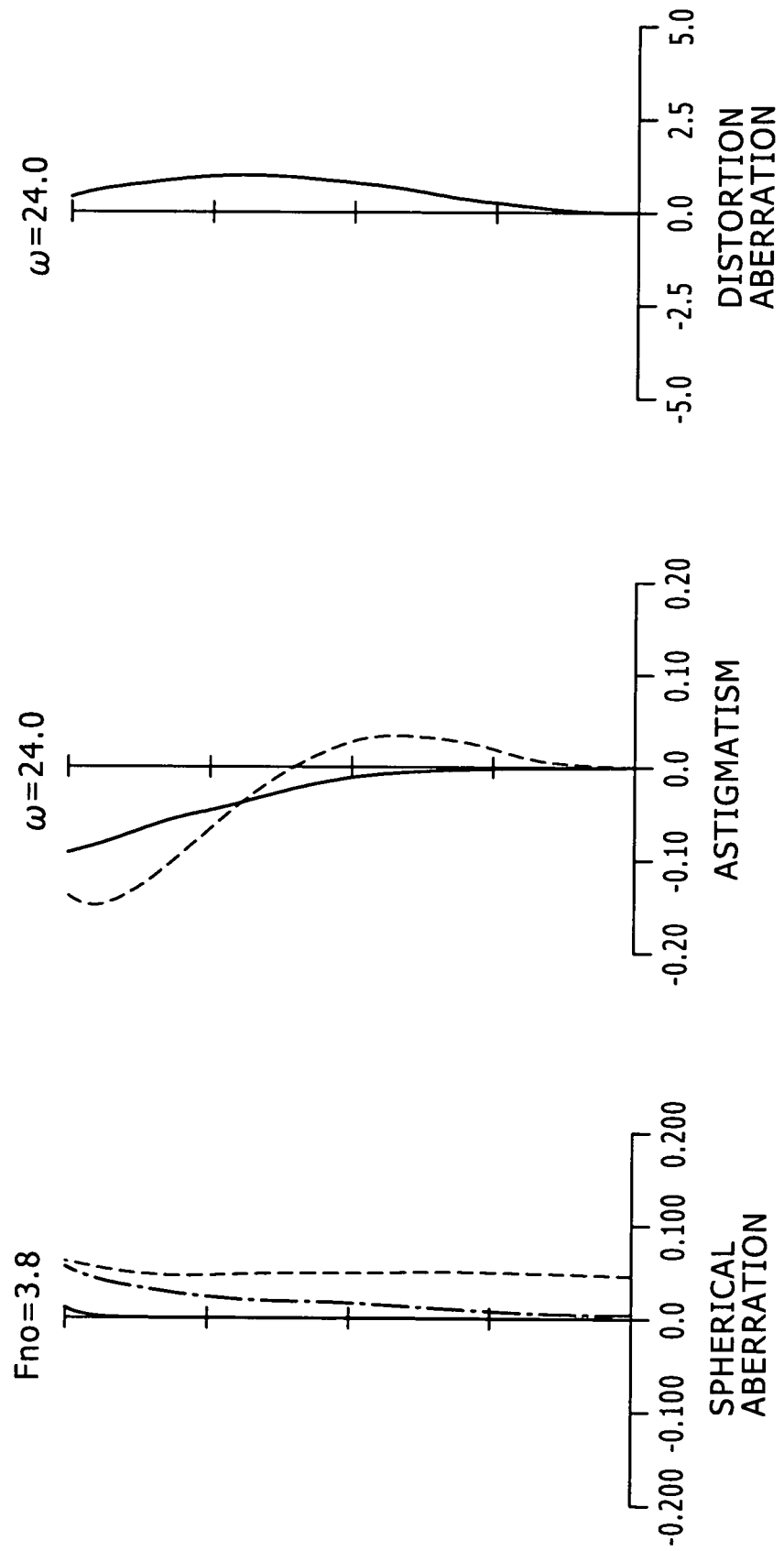
FIG. 7 is a diagram showing spherical aberration, astigmatism, and distortion aberration in an intermediate focal length state.
Figure 8:
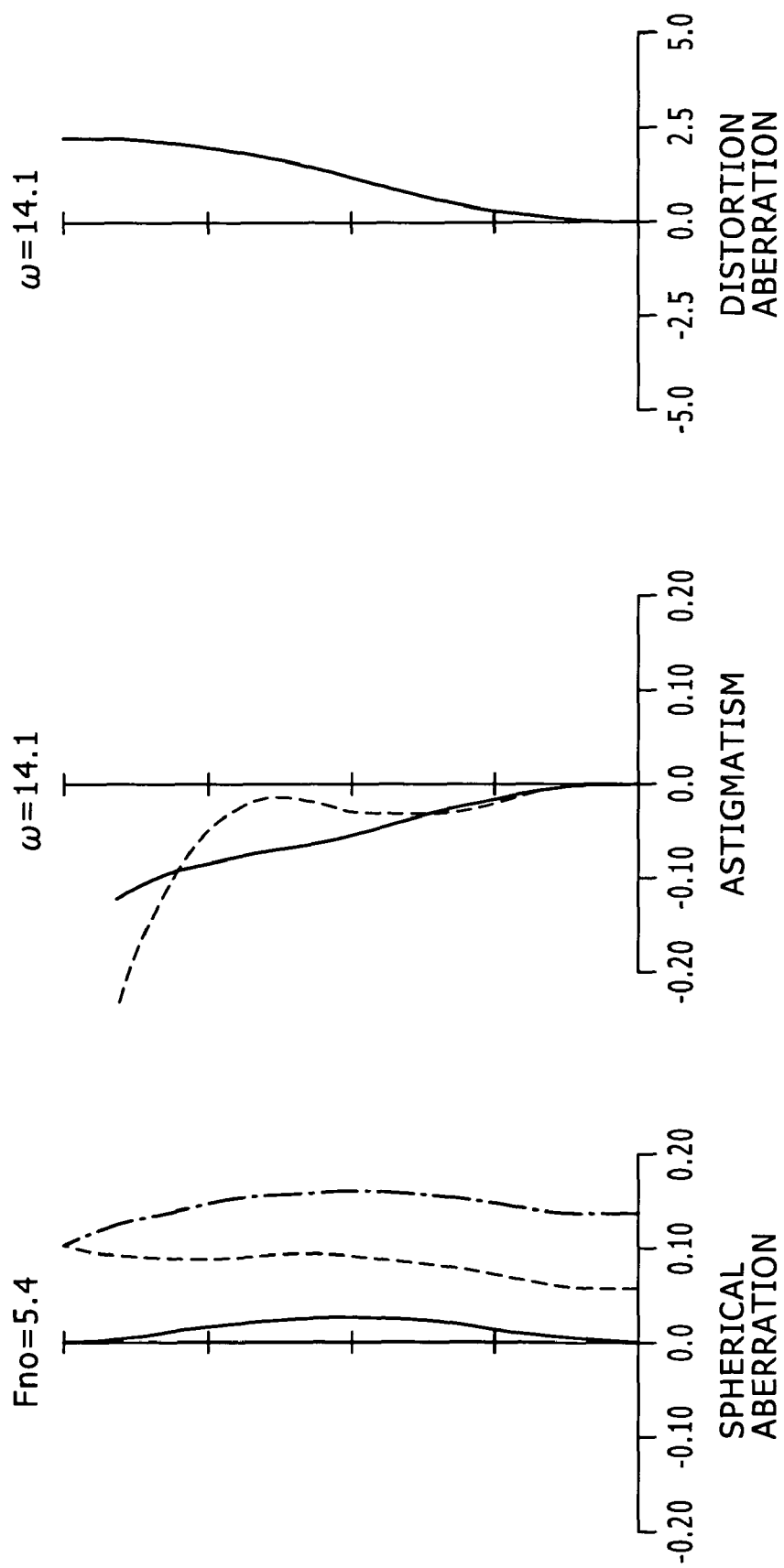
FIG. 8 is a diagram showing spherical aberration, astigmatism, and distortion aberration in a telephoto end state.

FIGS. 6 to 8 are diagrams of various aberrations in an infinity in-focus state in the second numerical embodiment. FIG. 6 is a diagram of various aberrations in the wide-angle end state (focal length f=10.68). FIG. 7 is a diagram of various aberrations in the intermediate focal length state (focal length f=17.93). FIG. 8 is a diagram of various aberrations in the telephoto end state (focal length f=31.11).

In the diagrams of spherical aberrations shown in FIGS. 6 to 8, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 6 to 8, a value in a sagittal image surface is shown by a solid line, and a value in a meridional image surface is shown by a broken line.

It is clear from each aberration diagram that the second numerical embodiment favorably corrects various aberrations and has excellent image forming performance.

Figure 9:
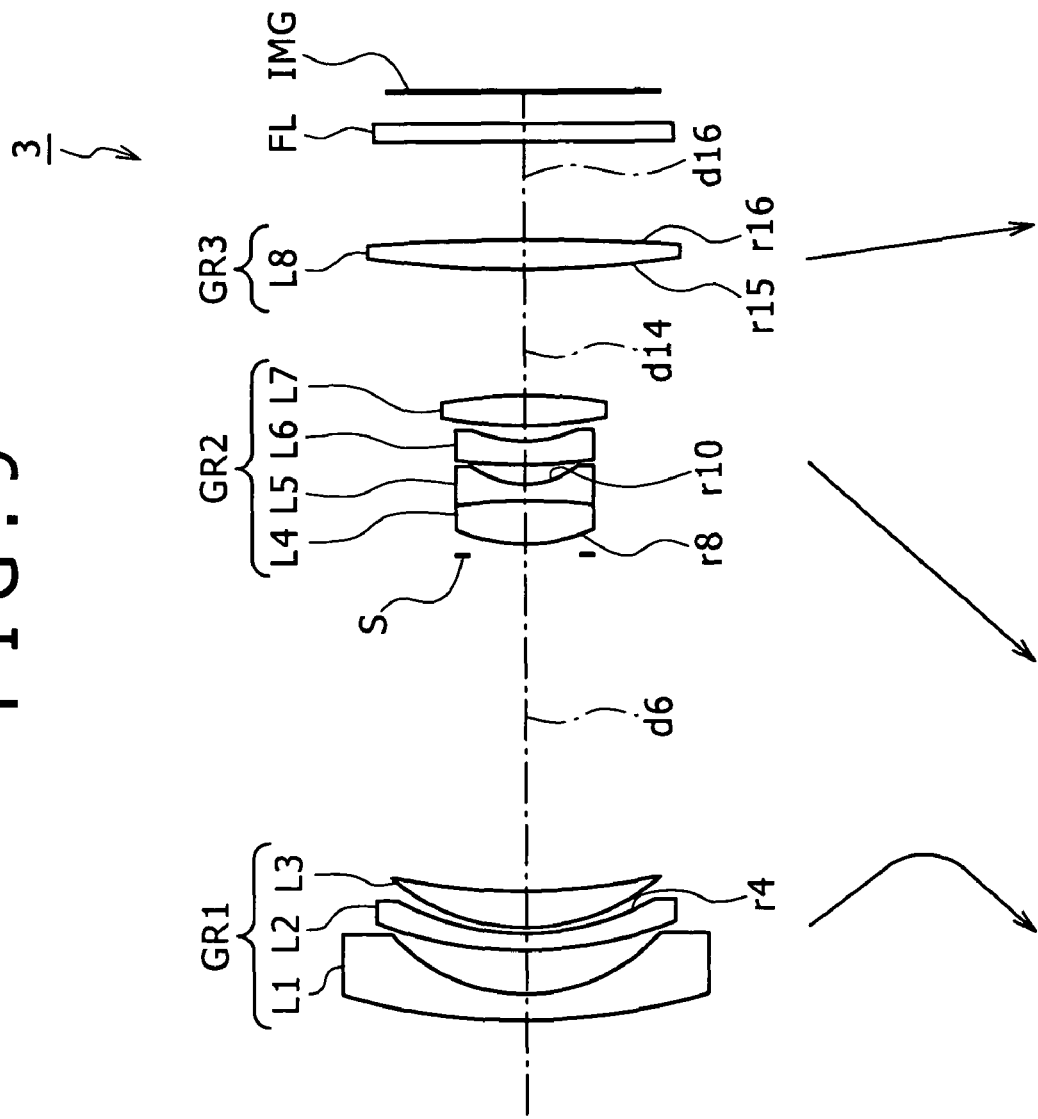
FIG. 9 is a diagram showing the lens configuration of a third embodiment of the zoom lens according to the present invention.

FIG. 9 is a diagram showing the lens configuration of a zoom lens 3 according to a third embodiment of the present invention.

The zoom lens 3 according to the third embodiment has eight lenses, as shown in FIG. 9.

The first lens group GR1 is formed by arranging a first lens L1 as a negative meniscus lens having a convex surface facing the object side, a second lens L2 as a negative meniscus lens having a surface on the image side formed as an aspheric surface and having a convex surface facing the object side, and a third lens L3 as a positive meniscus lens having a convex surface facing the object side in order from the object side to the image side.

A second lens group GR2 is formed by arranging a cemented lens, a sixth lens L6 as a negative meniscus lens having a concave surface facing the object side, and a seventh lens L7 as a biconvex lens in order from the object side to the image side. The cemented lens is formed by joining together a fourth lens L4 as a biconvex lens having a surface on the object side formed as an aspheric surface and a fifth lens L5 as a biconcave lens having a surface on the image side formed as an aspheric surface.

The third lens group GR3 is formed by arranging an eighth lens L8 as a biconvex lens having both surfaces formed as aspheric surfaces.

A diaphragm S (diaphragm surface r7) is disposed between the first lens group GR1 and the second lens group GR2.

A filter FL is arranged between the third lens group GR3 and an image surface IMG.

Table 7 shows lens data of a third numerical embodiment in which concrete numerical values are applied to the zoom lens 3 according to the third embodiment.

TABLE 7

| si | ri | di | ni | vi |
|---|---|---|---|---|
| 1 | 48.542 | 1.720 | 1.883000 | 40.8 |
| 2 | 12.253 | 3.440 | | |
| 3 | 26.299 | 1.204 | 1.795000 | 45.4 |
| 4 | 15.939(ASP) | 0.516 | | |
| 5 | 16.783 | 2.580 | 1.847000 | 23.8 |
| 6 | 51.429 | d6 | | |
| 7 (S) | INF | 1.720 | | |
| 8 | 8.635 (ASP) | 3.096 | 1.851350 | 40.1 |
| 9 | −94.857 | 1.548 | 1.805180 | 25.5 |
| 10 | 11.494 (ASP) | 1.720 | | |
| 11 | 153.401 | 1.548 | 1.751732 | 25.1 |
| 12 | 14.113 | 0.860 | | |
| 13 | 26.855 | 2.297 | 1.816000 | 46.6 |
| 14 | −30.983 | d14 | | |
| 15 | 59.675 (ASP) | 1.962 | 1.696800 | 55.5 |
| 16 | −47.778 (ASP) | d16 | | |
| 17 | INF | 1.720 | 1.516800 | 64.2 |
| 18 | INF | | | |

In the zoom lens 3, the surface (r4) on the image side of the second lens L2 of the first lens group GR1, the surface (r8) on the object side of the fourth lens L4 of the second lens group GR2, the surface (r10) on the image side of the fifth lens L5 of the second lens group GR2, the surface (r15) on the object side of the eighth lens L8 of the third lens group GR3, and the surface (r16) on the image side of the eighth lens L8 of the third lens group GR3 are formed as aspheric surfaces. The 4th-order, 6th-order, 8th-order, and 10th-order aspheric coefficients A4, A6, A8, and A10 of the aspheric surfaces in the third numerical embodiment are shown in Table 8 together with the conic constant K.

TABLE 8

| si | K | A4 | A6 | A8 | A10 |
|---|---|---|---|---|---|
| 4 | 0.00000E+00 | −3.984510E−05 | −3.509060E−07 | 2.985290E−09 | −2.583900E−11 |
| 8 | 0.00000E+00 | 4.693700E−05 | 9.610130E−07 | 5.302670E−09 | 4.752680E−10 |
| 10 | 0.00000E+00 | 4.146790E−04 | 1.053300E−05 | −1.616970E−07 | 1.775160E−08 |
| 15 | 0.00000E+00 | 1.399660E−04 | −3.328910E−06 | 4.209510E−08 | −2.702160E−10 |
| 16 | 0.00000E+00 | 2.191610E−04 | −4.369960E−06 | 5.058100E−08 | −3.056010E−10 |

In the zoom lens 3, at a time of varying power between a wide-angle end state and a telephoto end state, a surface interval d6 between the first lens group GR1 and the diaphragm S, a surface interval d14 between the second lens group GR2 and the third lens group GR3, and a surface interval d16 between the third lens group GR3 and the filter FL are changed. Variable intervals in a wide-angle end state (focal length f=10.42), an intermediate focal length state (focal length f=16.06), and a telephoto end state (focal length f=25.00) of each surface interval in the third numerical embodiment are shown in Table 9 together with an F-number Fno and a half angle of view ω.

TABLE 9

| | Fno | | |
|---|---|---|---|
| | 2.88 | 3.55 | 4.54 |
| f | 10.42 | 16.06 | 25.00 |
| ω | 38.68 | 26.58 | 17.50 |
| d6 | 22.334 | 10.820 | 2.580 |
| d14 | 7.908 | 4.980 | 3.000 |
| d16 | 1.551 | 2.240 | 1.700 |

Figure 10:
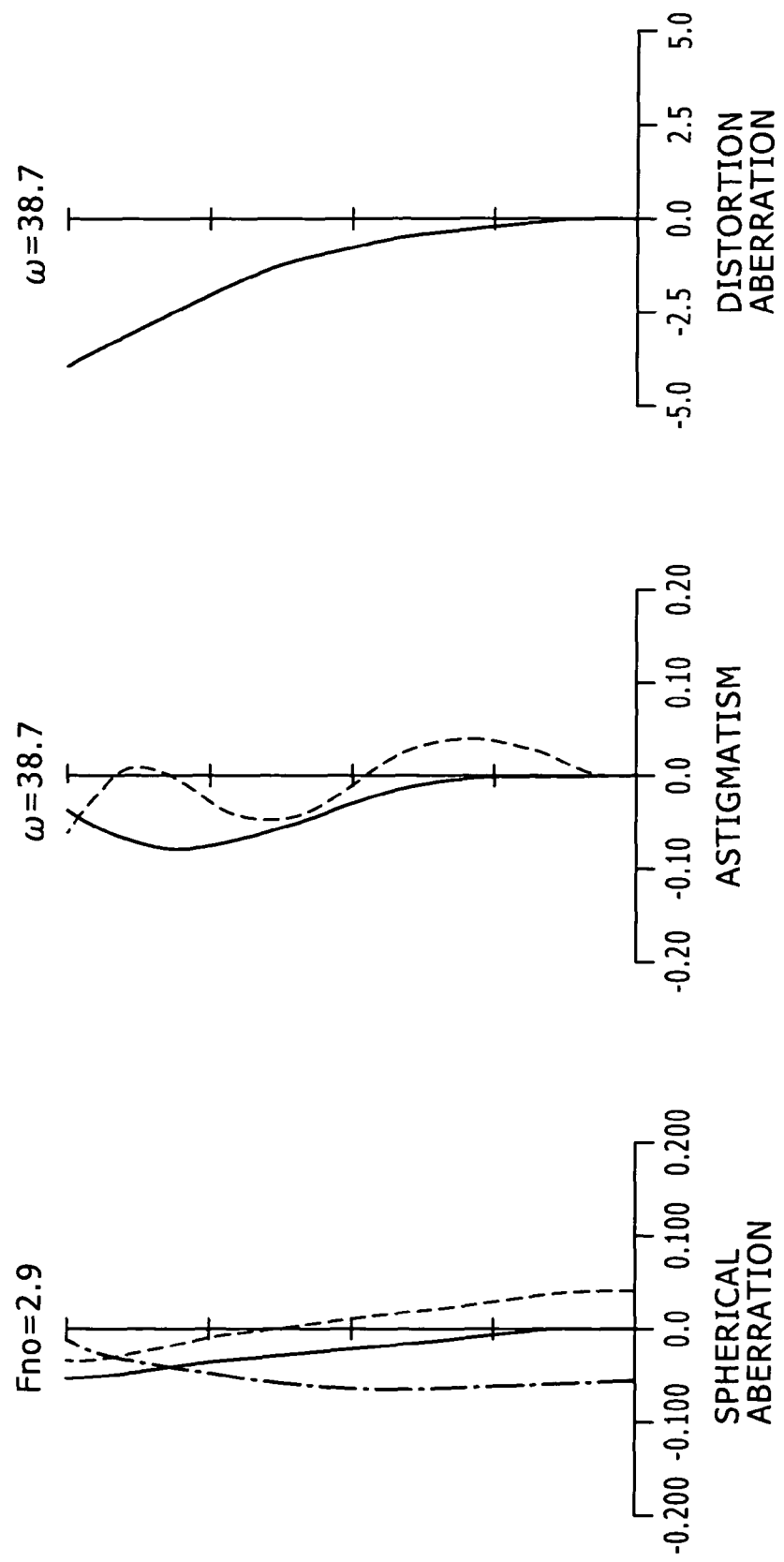
FIG. 10 is a diagram showing aberrations of a numerical embodiment in which concrete numerical values are applied to the third embodiment together with FIG. 11 and FIG. 12, FIG. 10 being a diagram showing spherical aberration, astigmatism, and distortion aberration in a wide-angle end state.
Figure 11:
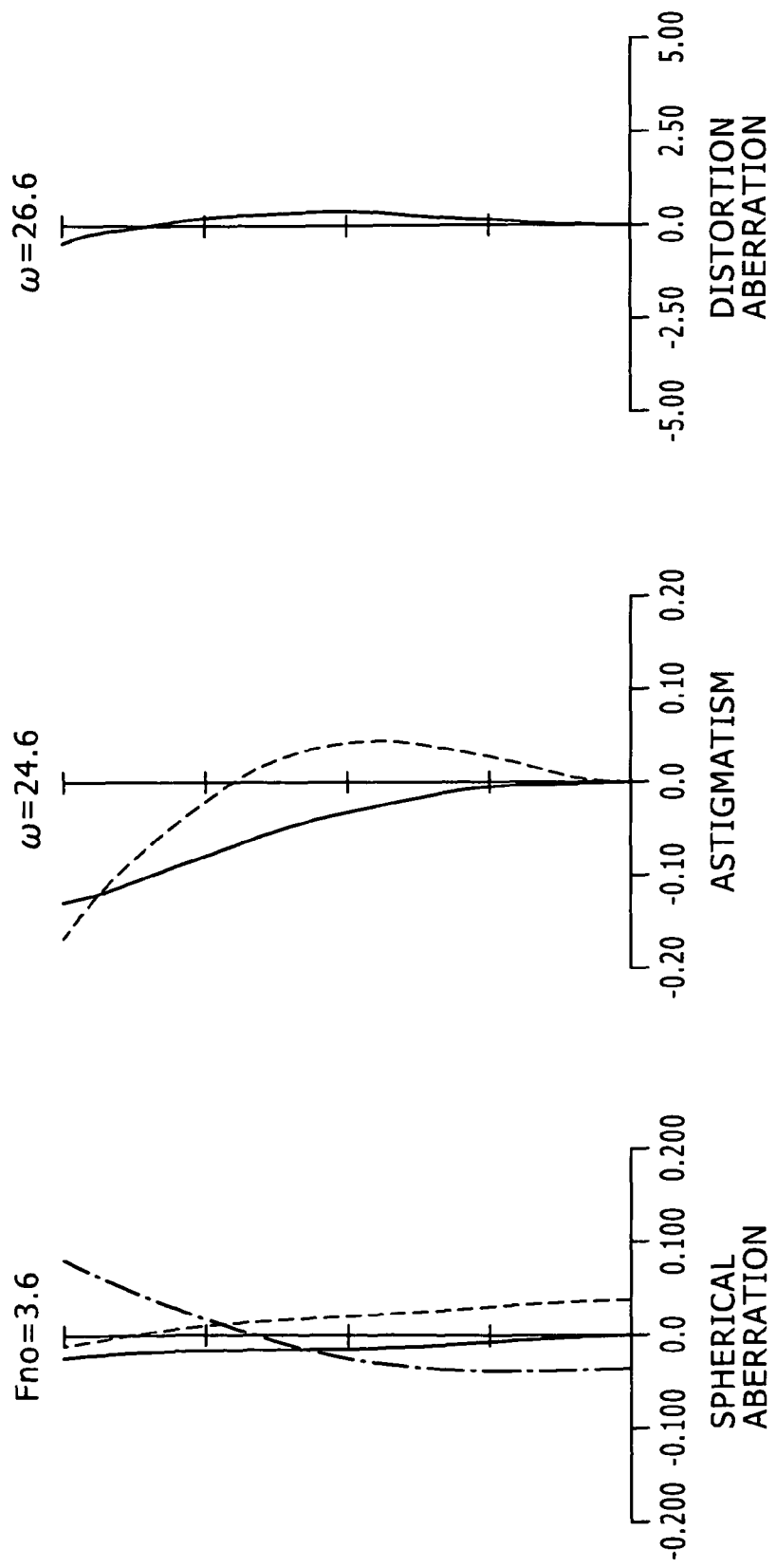
FIG. 11 is a diagram showing spherical aberration, astigmatism, and distortion aberration in an intermediate focal length state.
Figure 12:
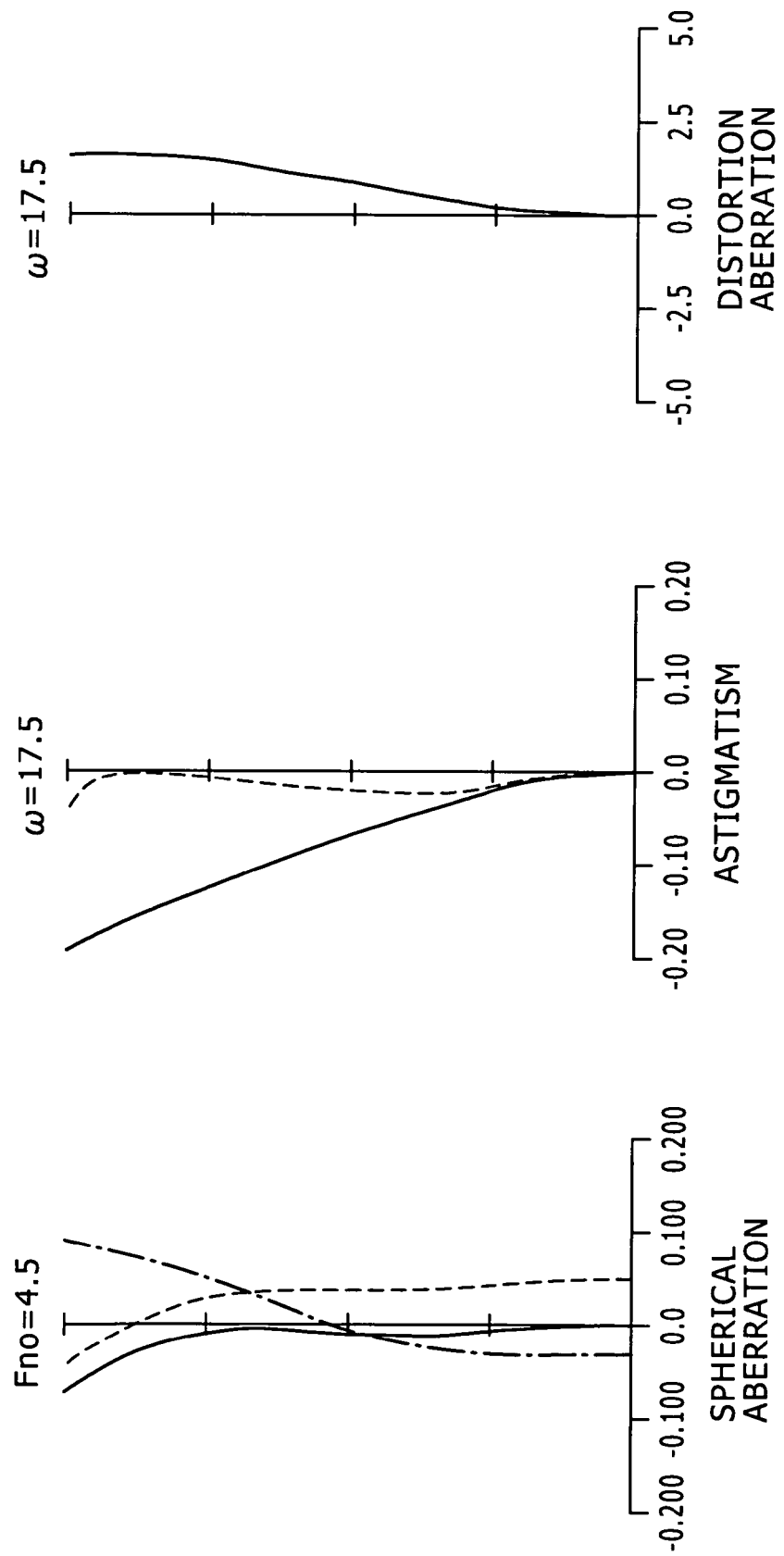
FIG. 12 is a diagram showing spherical aberration, astigmatism, and distortion aberration in a telephoto end state.

FIGS. 10 to 12 are diagrams of various aberrations in an infinity in-focus state in the third numerical embodiment. FIG. 10 is a diagram of various aberrations in the wide-angle end state (focal length f=10.42). FIG. 11 is a diagram of various aberrations in the intermediate focal length state (focal length f=16.06). FIG. 12 is a diagram of various aberrations in the telephoto end state (focal length f=25.00).

In the diagrams of spherical aberrations shown in FIGS. 10 to 12, the value of a d-line (wavelength of 587.6 nm) is shown by a solid line, the value of a c-line (wavelength of 656.3 nm) is shown by a dotted line, and the value of a g-line (wavelength of 435.8 nm) is shown by alternate long and short dashed lines. In the diagrams of astigmatism shown in FIGS. 10 to 12, a value in a sagittal image surface is shown by a solid line, and a value in a meridional image surface is shown by a broken line.

It is clear from each aberration diagram that the third numerical embodiment favorably corrects various aberrations and has excellent image forming performance.

Table 10 shows respective values of the above-described conditional expressions (1) and (2) in the zoom lenses 1 to 3, that is, f11, f12, and f11/f12 of the conditional expression (1) and D1, Dw, and D1/Dw of the conditional expression (2).

TABLE 10

| | | Zoom Lens 1 | Zoom Lens 2 | Zoom Lens 3 |
|---|---|---|---|---|
| | f11 | −18.152 | −20.080 | −18.876 |
| | f12 | −78.531 | −51.761 | −53.388 |
| Conditional Expression (1) | f11/f12 | 0.231 | 0.388 | 0.354 |
| | D1 | 8.648 | 10.733 | 9.460 |
| | Dw | 56.296 | 71.154 | 63.067 |
| Conditional Expression (2) | D1/Dw | 0.154 | 0.151 | 0.150 |

As is clear from Table 10, the zoom lenses 1 to 3 satisfy the above-described conditional expressions (1) and (2).

Description will next be made of an image pickup device according to an embodiment of the present invention.

The image pickup device according to the embodiment of the present invention includes a zoom lens and an image pickup element for converting an optical image formed by the zoom lens into an electric signal.

The zoom lens provided in the image pickup device according to the embodiment is formed by arranging a first lens group having a negative refractive power, a second lens group having a positive refractive power, and a third lens group having a positive refractive power in order from an object side to an image side.

In the zoom lens, at a time of varying power from a wide-angle end to a telephoto end, the first lens group is moved, the second lens group is moved to the object side, and the third lens is moved to the image side such that an air interval between the first lens group and the second lens group is decreased and such that an air interval between the second lens group and the third lens group is increased.

The first lens group is formed by arranging a first lens as a negative lens of a meniscus shape having a convex surface facing an object side, a second lens as a negative lens of a meniscus shape having a convex surface facing the object side, and a third lens as a positive lens in order from the object side to an image side.

The second lens group has a cemented lens formed by joining together a positive lens of a biconvex shape and a negative lens of a biconcave shape, and is formed by four lenses.

The zoom lens provided in the image pickup devide according to an embodiment of the present invention is formed so as to satisfy the following conditional expression (1) and conditional expression (2).

$$0.2 < f11/f12 < 0.5 \quad (1)$$

$$0.15 < D1/Dw < 0.2 \quad (2)$$

where f11 denotes the focal length of the first lens of the first lens group, f12 denotes the focal length of the second lens of the first lens group, D1 denotes the thickness on an optical axis of the first lens group, and Dw denotes a total optical length at a wide-angle end.

In the image pickup device according to the embodiment of the present invention, the first lens group of the zoom lens is formed by three lenses, as described above. Thus, the zoom lens can thereby make sufficient aberration correction when an angle of view is widened.

In addition, because the second lens group of the zoom lens is formed by four lenses, amounts of aberration correction assigned to each lens are decreased, decentration sensitivity is lowered, and a degree of manufacturing difficulty can be decreased.

Further, chromatic aberration of magnification can be corrected favorably by disposing the cemented lens formed by joining together a positive lens of a biconvex shape and a negative lens of a biconcave shape in the second lens group of the zoom lens.

Thus, in the image pickup device according to the embodiment, by forming the first lens group of the zoom lens by three lenses and forming the second lens group by four lenses including the cemented lens, it is possible to widen an angle of view, enhance performance, and improve mass productivity.

The conditional expression (1) defines a ratio between the focal lengths of the first lens and the second lens forming the first lens group.

When the upper limit value of the conditional expression (1) is exceeded, the negative refractive power of the first lens is weakened, and therefore the height of an off-axis light beam passing through the first lens is increased, which invites an increase in lens diameter.

On the other hand, when the lower limit value of the conditional expression (1) is exceeded, it is difficult to correct distortion aberration.

The conditional expression (2) defines the total length of the first lens group.

When the upper limit value of the conditional expression (2) is exceeded, the thickness of the second lens group is increased, and the total optical length is lengthened, so that a need for miniaturization is not satisfied. In particular, the total length of the zoom lens at a time of being housed when the zoom lens is used in a collapsible image pickup device of a type having a lens barrel that extends and contracts is lengthened, thus hindering miniaturization.

On the other hand, when the lower limit value of the conditional expression (2) is exceeded, sensitivity to a decentration error of the first lens group is increased, and thus very high precision is required of assembly.

Therefore, in the image pickup device according to the embodiment of the present invention, by satisfying the conditional expression (1) and the conditional expression (2), it is possible to achieve miniaturization, an enhancement of performance, and an improvement in mass productivity.

In particular, the total length of the zoom lens at a time of being collapsed when the zoom lens is used in a collapsible image pickup device of a type having a lens barrel that extends and contracts can be shortened.

Figure 13:
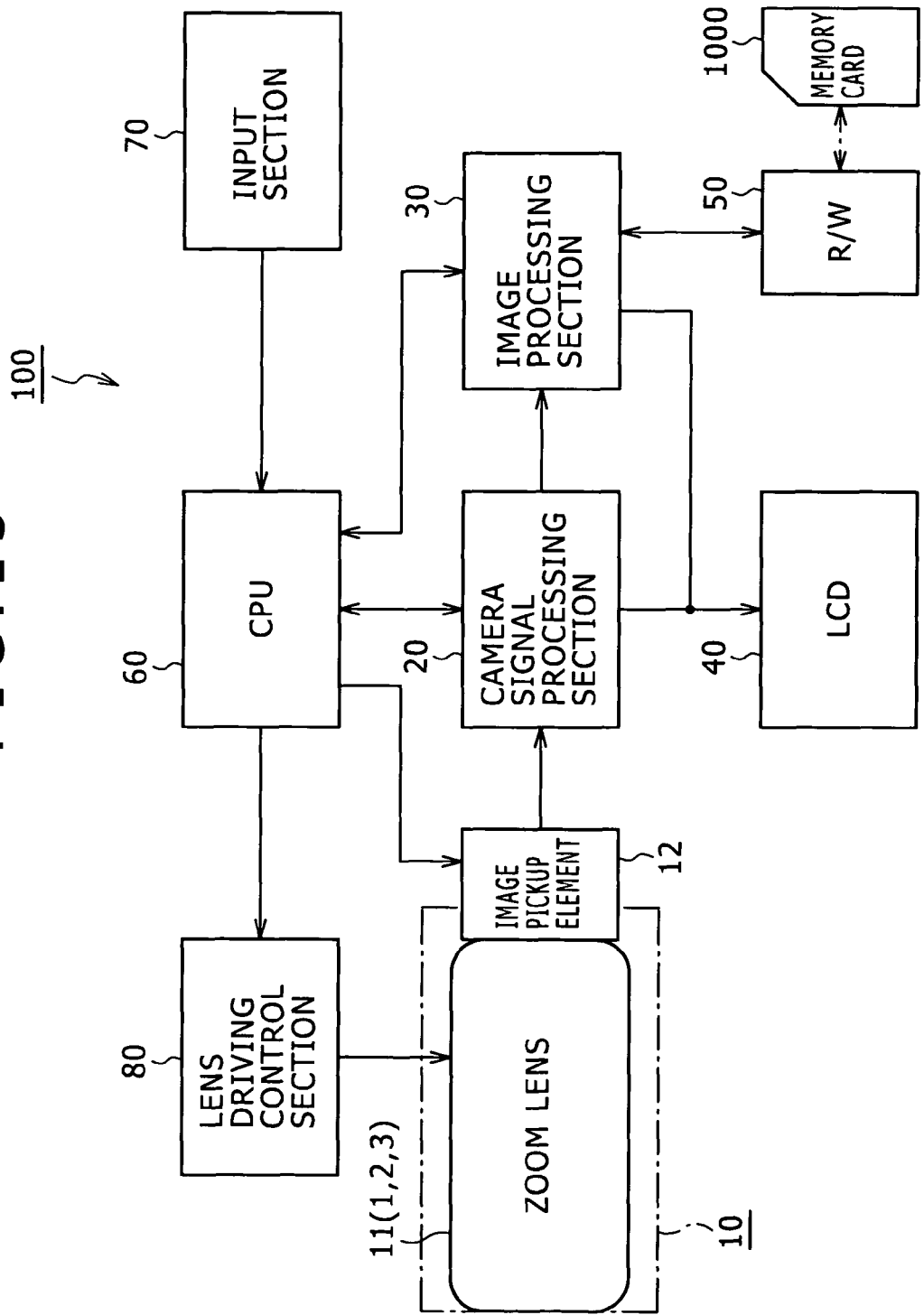
FIG. 13 is a block diagram showing an embodiment of the image pickup device according to the present invention.

FIG. 13 is a block diagram of a digital still camera in accordance with one embodiment of an image pickup device according to the present invention.

An image pickup device (digital still camera) 100 includes: a camera block 10 configured to perform an image pickup function; a camera signal processing section 20 configured to perform signal processing such as analog-to-digital conversion and the like on a taken image signal; an image processing section 30 configured to record and reproduce the image signal; an LCD (Liquid Crystal Display) 40 configured to display a taken image and the like; an R/W (Reader/Writer) 50 configured to write the image signal to a memory card 1000 and to read the image signal; a CPU (Central Processing Unit) 60 configured to control the whole of the image pickup device; an input section 70 composed of various switches and the like on which a necessary operation is performed by a user; and a lens driving control section 80 configured to control the driving of lenses disposed in the camera block 10.

The camera block 10 includes for example an optical system including a zoom lens 11 (zoom lens 1, 2, or 3 to which each of the embodiments of the present invention is applied) and an image pickup element 12 such as a CCD (Charge Coupled Device), a CMOS (Complementary Metal Oxide Semiconductor) image pickup element or the like.

The camera signal processing section 20 performs various signal processing such as conversion of an output signal from the image pickup element 12 into a digital signal, noise removal, image quality correction, conversion to a luminance and a color-difference signal, and the like.

The image processing section 30 performs a process of compression coding and expansion decoding of an image signal on the basis of a predetermined image data format, a process of converting resolution and other data specifications, and the like.

The LCD 40 has a function of displaying a state of operation on the input section 70 by a user and various data such as a taken image and the like.

The R/W 50 writes image data coded by the image processing section 30 to the memory card 1000 and reads image data recoded on the memory card 1000.

The CPU 60 functions as a control processing section configured to control each circuit block provided in the image pickup device 100. The CPU 60 controls each circuit block on the basis of an instruction input signal from the input section 70 and the like.

The input section 70 is for example formed by a shutter release button for performing a shutter operation, a selector switch for selecting an operation mode, and the like. The input section 70 outputs an instruction input signal corresponding to an operation by a user to the CPU 60.

The lens driving control section 80 controls for example a motor not shown in the figure for driving each lens of the zoom lens 11 on the basis of a control signal from the CPU 60.

The memory card 1000 is for example a semiconductor memory detachable from a slot connected to the R/W 50.

Operation in the image pickup device 100 will be described in the following.

In a standby state for picture taking, under control of the CPU 60, an image signal taken in the camera block 10 is output to the LCD 40 via the camera signal processing section 20, and is displayed as a camera-through image. When an instruction input signal for zooming is input from the input section 70, the CPU 60 outputs a control signal to the lens driving control section 80, and a predetermined lens of the zoom lens 11 is moved under control of the lens driving control section 80.

When a shutter not shown in the figure in the camera block 10 is operated by an instruction input signal from the input section 70, a taken image signal is output from the camera signal processing section 20 to the image processing section 30, subjected to compression coding, and converted to digital data in a predetermined data format. The converted data is output to the R/W 50, and written to the memory card 1000.

Incidentally, focusing is performed by moving a predetermined lens of the zoom lens 11 by the lens driving control section 80 on the basis of a control signal from the CPU 60 when the shutter release button of the input section 70 is pressed halfway or pressed all the way for recording (photographing), for example.

When image data recorded on the memory card 1000 is reproduced, the predetermined image data is read from the memory card 1000 by the R/W 50 according to an operation on the input section 70, and subjected to expansion decoding by the image processing section 30. Thereafter, a reproduced image signal is output to the LCD 40, and a reproduced image is displayed.

Incidentally, while in the foregoing embodiment, an example of applying the image pickup device to a digital still camera has been shown, the scope of application of the image pickup device is not limited to the digital still camera. The image pickup device is widely applicable as for example a camera section of digital input-output devices such as a digital video camera, a portable telephone including a camera, a PDA (Personal Digital Assistant) including a camera, and the like.

The shapes and numerical values of respective parts illustrated in each of the foregoing embodiments are each a mere example of embodiment in carrying out the present invention, and the technical scope of the present invention is not to be construed in a restricted manner by these shapes and numerical values.

The present application contains subject matter related to that disclosed in Japanese Priority Patent Application JP 2008-295878 filed in the Japan Patent Office on Nov. 19, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A zoom lens formed by arranging a first lens group having a negative refractive power, a second lens group having a positive refractive power, and a third lens group having a positive refractive power in order from an object side to an image side, wherein
   at a time of varying power from a wide-angle end to a telephoto end, said first lens group is moved, said second lens group is moved to the object side, and said third lens group is moved to the image side such that an air interval between said first lens group and said second lens group is decreased and such that an air interval between said second lens group and said third lens group is increased, said first lens group is formed by arranging a first lens as a negative lens of a meniscus shape having a convex surface facing the object side, a second lens as a negative lens of a meniscus shape having a convex surface facing the object side, and a third lens as a positive lens in order from the object side to the image side, said second lens group has a cemented lens formed by joining together a positive lens of a biconvex shape and a negative lens of a biconcave shape, and is formed by four lenses, and the zoom lens is formed so as to satisfy a following conditional expression (1) and a following conditional expression (2):

$$0.2 < f11/f12 < 0.5 \quad (1)$$

$$0.15 < D1/Dw < 0.2 \quad (2)$$

where f11 denotes a focal length of the first lens of said first lens group, f12 denotes a focal length of the second lens of said first lens group, D1 denotes thickness on an optical axis of said first lens group, and Dw denotes a total optical length at a wide-angle end.

2. The zoom lens according to claim 1,
wherein an outermost surface on the object side of said second lens group is formed as an aspheric surface.

3. The zoom lens according to claim 1,
wherein a surface on the image side of the second lens of said first lens group is formed as an aspheric surface.

4. The zoom lens according to claim 3,
wherein the surface on the image side of the second lens of said first lens group is formed as an aspheric surface by thinly coating a resin.

5. An image pickup device comprising:
a zoom lens; and
an image pickup element for converting an optical image formed by said zoom lens into an electric signal, wherein
said zoom lens is formed by arranging a first lens group having a negative refractive power, a second lens group having a positive refractive power, and a third lens group having a positive refractive power in order from an object side to an image side,
at a time of varying power from a wide-angle end to a telephoto end, said first lens group is moved, said second lens group is moved to the object side, and said third lens group is moved to the image side such that an air interval between said first lens group and said second lens group is decreased and such that an air interval between said second lens group and said third lens group is increased,
said first lens group is formed by arranging a first lens as a negative lens of a meniscus shape having a convex surface facing the object side, a second lens as a negative lens of a meniscus shape having a convex surface facing the object side, and a third lens as a positive lens in order from the object side to the image side,
said second lens group has a cemented lens formed by joining together a positive lens of a biconvex shape and a negative lens of a biconcave shape, and is formed by four lenses, and
said zoom lens is formed so as to satisfy a following conditional expression (1) and a following conditional expression (2):

$$0.2 < f11/f12 < 0.5 \quad (1)$$

$$0.15 < D1/Dw < 0.2 \quad (2)$$

where f11 denotes a focal length of the first lens of said first lens group, f12 denotes a focal length of the second lens of said first lens group, D1 denotes thickness on an optical axis of said first lens group, and Dw denotes a total optical length at a wide-angle end.

6. A zoom lens comprising:
in order from an object side to an image side, a first lens group having a negative refractive power, a second lens group having a positive refractive power, and a third lens group having a positive refractive power, wherein
at a time of varying power from a wide-angle end to a telephoto end, a distance between the first lens group and the second lens group is decreased and a distance between the second lens group and the third lens group is increased by moving the first lens group, moving the second lens group to the object side, and moving the third lens group to the image side,
the first lens group includes, in order from the object side to the image side, a first lens having negative refractive power, a second lens having negative refractive power, and a third lens as a positive lens, and
the zoom lens satisfies following conditional expressions (1) and (2):

$$0.2 < f11/f12 < 0.5 \quad (1)$$

$$0.15 < D1/Dw < 0.2 \quad (2)$$

where f11 denotes a focal length of the first lens of the first lens group, f12 denotes a focal length of the second lens of the first lens group, D1 denotes thickness on an optical axis of the first lens group, and Dw denotes a total optical length at a wide-angle end.

7. The zoom lens according to claim 6,
wherein a surface on the image side of the second lens of the first lens group is an aspheric surface.

8. The zoom lens according to claim 6,
wherein an aspheric surface is formed on a surface on the image side of the second lens of the first lens group with a thin resin coating.

9. The zoom lens according to claim 6,
wherein a lens of the second lens group that is closest to the object side has an aspheric surface toward the object side.

10. An image pickup device comprising:
a zoom lens according to claim 6; and
an image pickup element for converting an optical image formed by the zoom lens into an electric signal.

11. The zoom lens according to claim 6, wherein
the first lens of the first lens group has a meniscus shape having a convex surface facing the object side.

12. The zoom lens according to claim 11, wherein
the second lens of the first lens group has a meniscus shape having a convex surface facing the object side.

13. The zoom lens according to claim 6, wherein
the second lens group includes a first cemented lens including a positive lens of a biconvex shape joined to a negative lens of a biconcave shape.

14. The zoom lens according to claim 13, wherein
the second lens group further includes a second cemented lens including a negative meniscus lens having a concave surface facing the image side joined to a positive meniscus lens having a concave surface facing the image side.

15. The zoom lens according to claim 14, wherein
in the second lens group, the first cemented lens is arranged before the second cemented lens, in order from an object side to an image side.

* * * * *